(12) United States Patent
Tatarnikov et al.

(10) Patent No.: US 11,327,183 B2
(45) Date of Patent: May 10, 2022

(54) COMPACT INTEGRATED GNSS ANTENNA SYSTEM WITH VERTICAL SEMITRANSPARENT SCREEN FOR REDUCING MULTIPATH RECEPTION

(71) Applicant: Topcon Positioning Systems, Inc., Livermore, CA (US)

(72) Inventors: Dmitry Vitalievich Tatarnikov, Moscow (RU); Alexey Anatolievich Generalov, Moscow (RU); Andrey Vitalievich Astakhov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 889 days.

(21) Appl. No.: 16/091,152

(22) PCT Filed: May 18, 2018

(86) PCT No.: PCT/RU2018/000240
§ 371 (c)(1),
(2) Date: Oct. 4, 2018

(87) PCT Pub. No.: WO2019/221626
PCT Pub. Date: Nov. 21, 2019

(65) Prior Publication Data
US 2021/0165106 A1 Jun. 3, 2021

(51) Int. Cl.
*G01S 19/36* (2010.01)
*G01S 19/32* (2010.01)
(Continued)

(52) U.S. Cl.
CPC .............. *G01S 19/36* (2013.01); *G01S 19/32* (2013.01); *H01Q 1/24* (2013.01); *H01Q 1/48* (2013.01); *H01Q 5/307* (2015.01); *H01Q 9/0428* (2013.01)

(58) Field of Classification Search
CPC . G01S 19/32; H01Q 1/24; H01Q 1/48; H01Q 9/0428
See application file for complete search history.

(56) References Cited

U.S. PATENT DOCUMENTS

2007/0085742 A1* 4/2007 Kikin ................... H01Q 9/0464
343/795
2011/0115676 A1 5/2011 Tatarnikov et al.
(Continued)

OTHER PUBLICATIONS

Search Report in PCT/RU2018/000240, dated Jan. 23, 2019.
(Continued)

*Primary Examiner* — Erin F Heard
*Assistant Examiner* — Helena H Seraydaryan
(74) *Attorney, Agent, or Firm* — Bardmesser Law Group

(57) ABSTRACT

An antenna system includes a right-hand circularly polarized antenna for receiving Global Navigation Satellite System (GNSS) signals and located on a receiver housing; a vertical semitransparent screen for providing an Down/Up ratio $$DU_{90} = DU(\theta^e = 90°) = \frac{F(-90°)}{F(90°)}$$

of −13 dB or better for at least some GNSS frequencies; the semitransparent screen being connected to a ground plane of the antenna; the ground plane being connected to a conductive receiver housing; the semitransparent screen further comprising a horizontal slot to which sets of lumped impedance elements are connected. Each set includes several lumped elements; where the lumped elements are capacitors and/or inductors and/or resistors; where the lumped elements in each set are connected in parallel or series; and the
(Continued)

semitransparent screen including at least 4 segments arranged symmetrically around the center of the antenna and connected to each other.

10 Claims, 13 Drawing Sheets

(51) Int. Cl.
    *H01Q 5/30*     (2015.01)
    *H01Q 1/24*     (2006.01)
    *H01Q 1/48*     (2006.01)
    *H01Q 5/307*    (2015.01)
    *H01Q 9/04*     (2006.01)

(56) References Cited

U.S. PATENT DOCUMENTS

| | | |
|---|---|---|
| 2014/0028520 A1 | 1/2014 | Huynh |
| 2015/0077299 A1 | 3/2015 | Tatarnikov et al. |
| 2018/0159210 A1* | 6/2018 | Tatarnikov ............... H01Q 1/42 |

OTHER PUBLICATIONS

L. Boccia et al., A dual frequency microstrip patch antenna for high-precision GPS applications, IEEE Antennas and Wireless Propagation Letters, vol. 3, 2004.

* cited by examiner

COMPACT INTEGRATED GNSS ANTENNA SYSTEM WITH VERTICAL SEMITRANSPARENT SCREEN FOR REDUCING MULTIPATH RECEPTION

BACKGROUND OF THE INVENTION

Field of the Invention

The present invention relates generally to antennas, and more particularly to a compact antenna system with a reduced antenna directivity pattern (DP) in the bottom hemisphere.

Background of the Related Art

Global navigation satellite systems (GNSSs) can determine locations with high accuracy. Such Global navigation satellite systems are widely used for high-precision positioning, such as the US Global Positioning System (GPS) and Russian global navigation system GLONASS, as well as European global navigation system (Galileo), Chinese navigation system BeiDou and some others. GNSSs are used in a wide range of applications, such as surveying, geology, and mapping. In a GNSS, a navigation receiver receives and processes radio signals transmitted by satellites located within a line-of-sight of the navigation receiver. A critical component of a GNSS is the receiver antenna. Key properties of the antenna are bandwidth, multipath rejection, size, and weight. High-accuracy navigation receivers typically process signals from two frequency bands. Two common frequency bands are a low-frequency (LF) band in the range of 1165-1300 MHz and a high-frequency (HF) band in the range of 1525-1610 MHz.

Patch-antennas are widely used in satellite positioning systems. Their main advantage is a relatively small height, enabling a design of low-profile devices. A patch-antenna shown in FIG. 3 comprises a patch 302 arranged above a ground plane 301, the lateral dimension of the ground plane being greater than that of the patch.

To provide a high quality signal reception from navigation satellites located over the whole celestial hemisphere up to angles close to the horizon, the antenna has to possess wide enough DP in the upper hemisphere. The width of the patch antenna DP is determined by the lateral dimension of the patch. The smaller the lateral dimension is, the wider DP will be. As rule, the lateral dimension of the patch is 0.2-0.3 of the wavelength. The minimal length is normally defined by the operating bandwidth. The dielectric 303 between a ground plane 301 and a patch 302 or capacitive elements provide a resonant operation mode.

Signals reflected from the ground are a considerable source of errors in GNSS systems. To reduce these errors, a low DP level in the bottom hemisphere should be ensured. This can be done by selecting a lateral dimension of the ground plane, this dimension being 0.5 wavelength and larger. The lateral dimension of the ground plane determines antenna sizes, the wavelength corresponding to the minimal frequency of the operating band. In GNSS this frequency is 1165 MHz, which corresponds to 258 mm. So the overall antenna dimension is 130 mm and greater. Further reduction in lateral dimension of the ground plane results in a considerable increase of DP level in the bottom hemisphere. Then, if the lateral dimension of the ground plane is equal to the lateral dimension of the patch, DP level in the bottom hemisphere becomes the same as that of the upper hemisphere, which is unacceptable for normal operation of high-precision GNSS receivers.

Thus, minimal lateral dimension of an ordinary patch antenna is limited by a lateral dimension of the ground plane providing the required low level of DP in the bottom hemisphere.

When such an antenna is used with a housing of an integrated receiver, the antenna also has to be limited in height. In patent publication US20110115676, a patch-antenna design was supplemented by a passive antenna element called an anti-antenna. This allowed a reduction in the lateral dimension. However, vertical dimension (height) of the anti-antenna is comparable with the vertical dimension (height) of the patch-antenna. So this approach leads to the fact that the height of the antenna part of the receiver is 1.5-2 times as much as antenna element (patch-antenna) without the anti-antenna.

Accordingly, there is a need in the art for an antenna system for high-precision GNSS applications with small dimensions in both plan view and vertical, while still providing effective suppression of multipath signals.

SUMMARY OF THE INVENTION

In one embodiment, an antenna system includes a patch antenna installed onto a conducting housing of an integrated receiver and a vertical semitransparent screen intended for providing a required directivity pattern (DP) in the bottom hemisphere. The vertical semitransparent screen includes slots with a set of elements with such pre-set impedance that their availability does not cause antenna mismatch, and current in the vertical semitransparent screen provides additional electromagnetic field which is subtracted from the antenna field in the nadir direction.

Such a design enables implementing a low DP level in the bottom hemisphere, ensuring low overall antenna dimensions in plan view and vertical dimension.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The attached drawings that further describe the present invention are incorporated in and constitute a part of specification, illustrate embodiments of the invention and together with the description serve to explain the principles of the invention.

Figure 4:
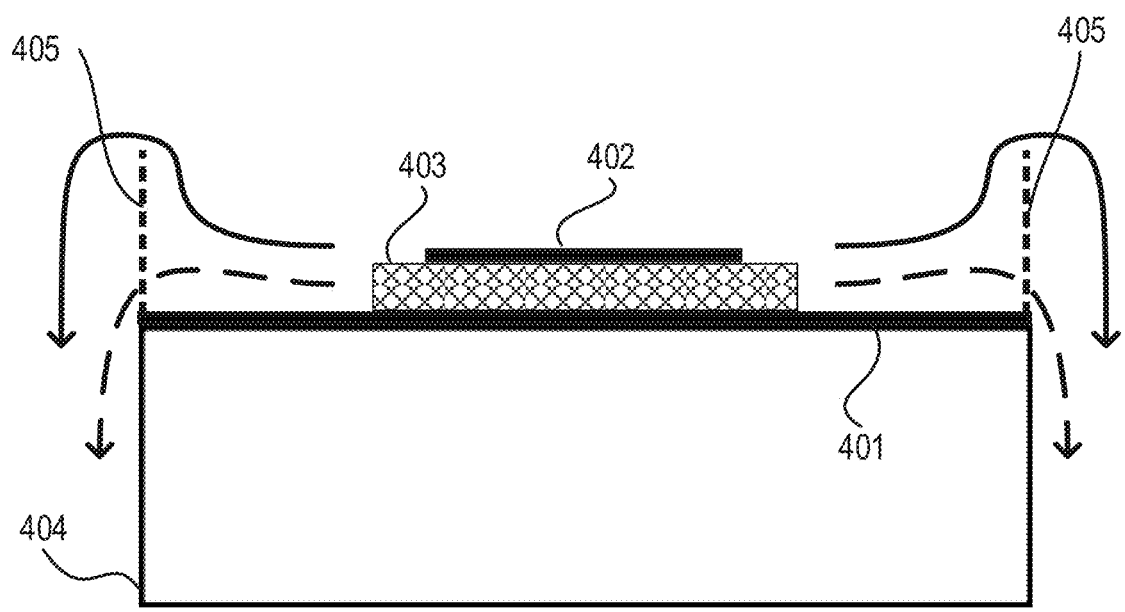
Figure 5:
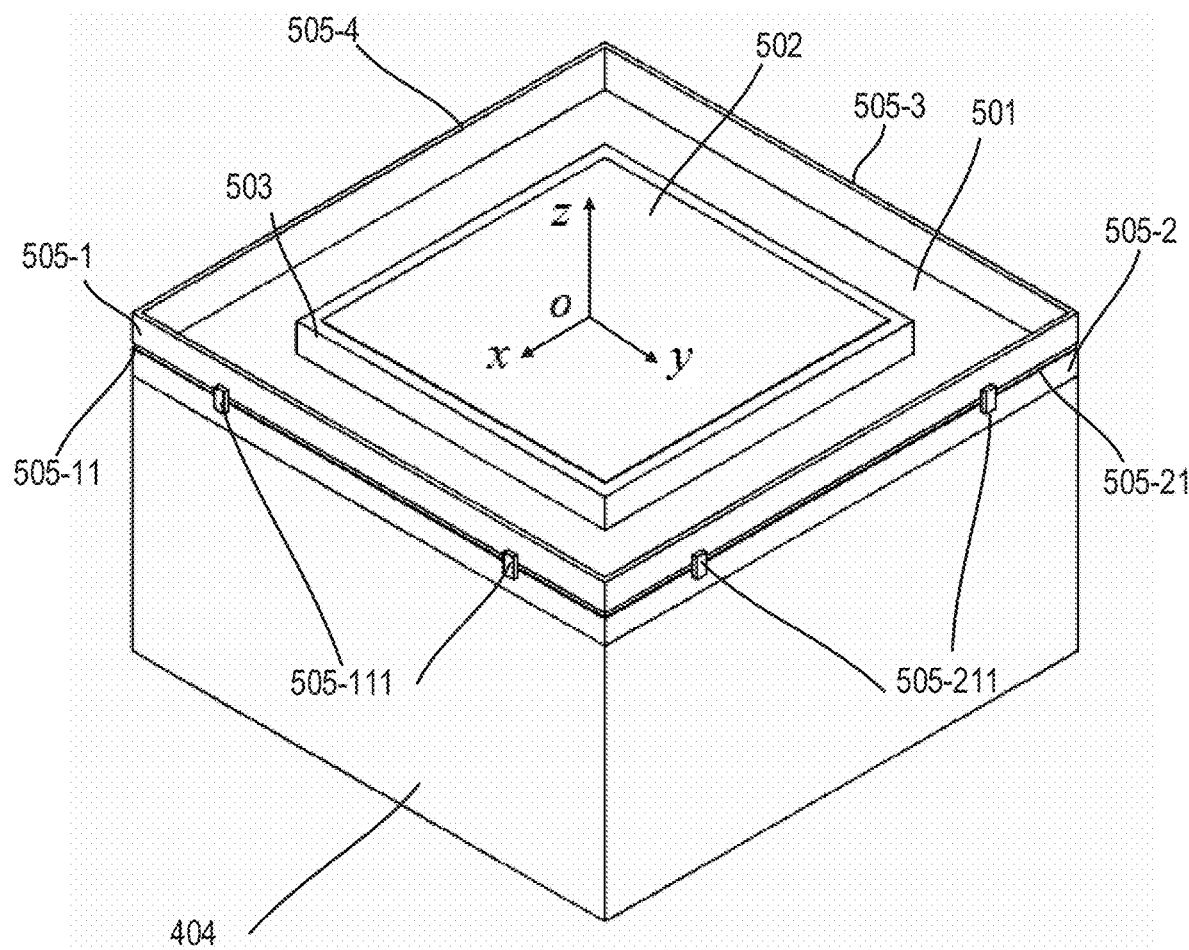
Figure 6:
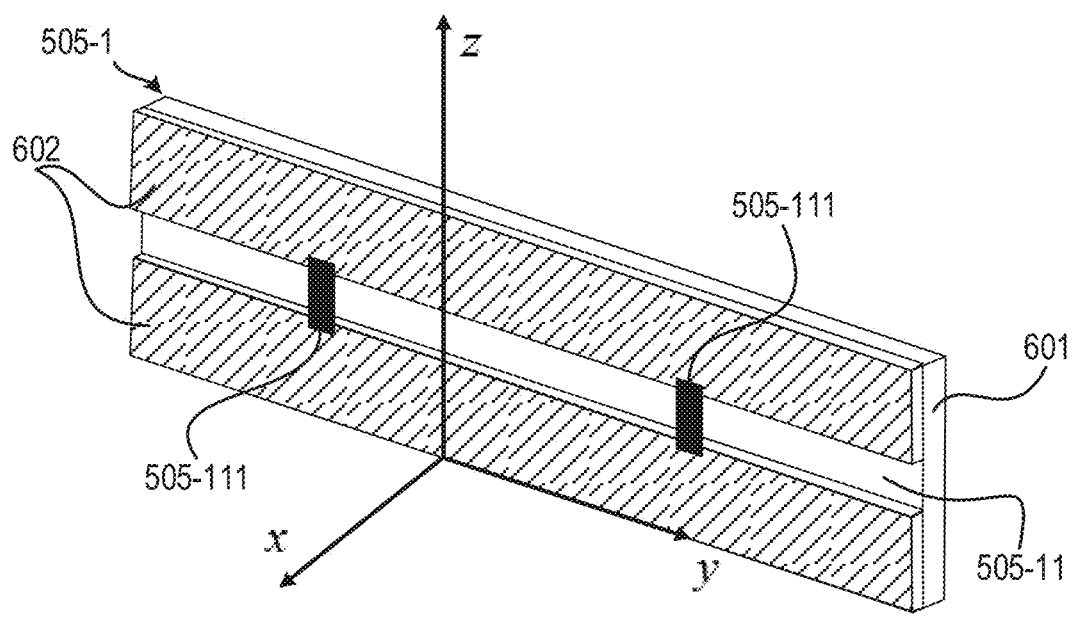
Figure 8:
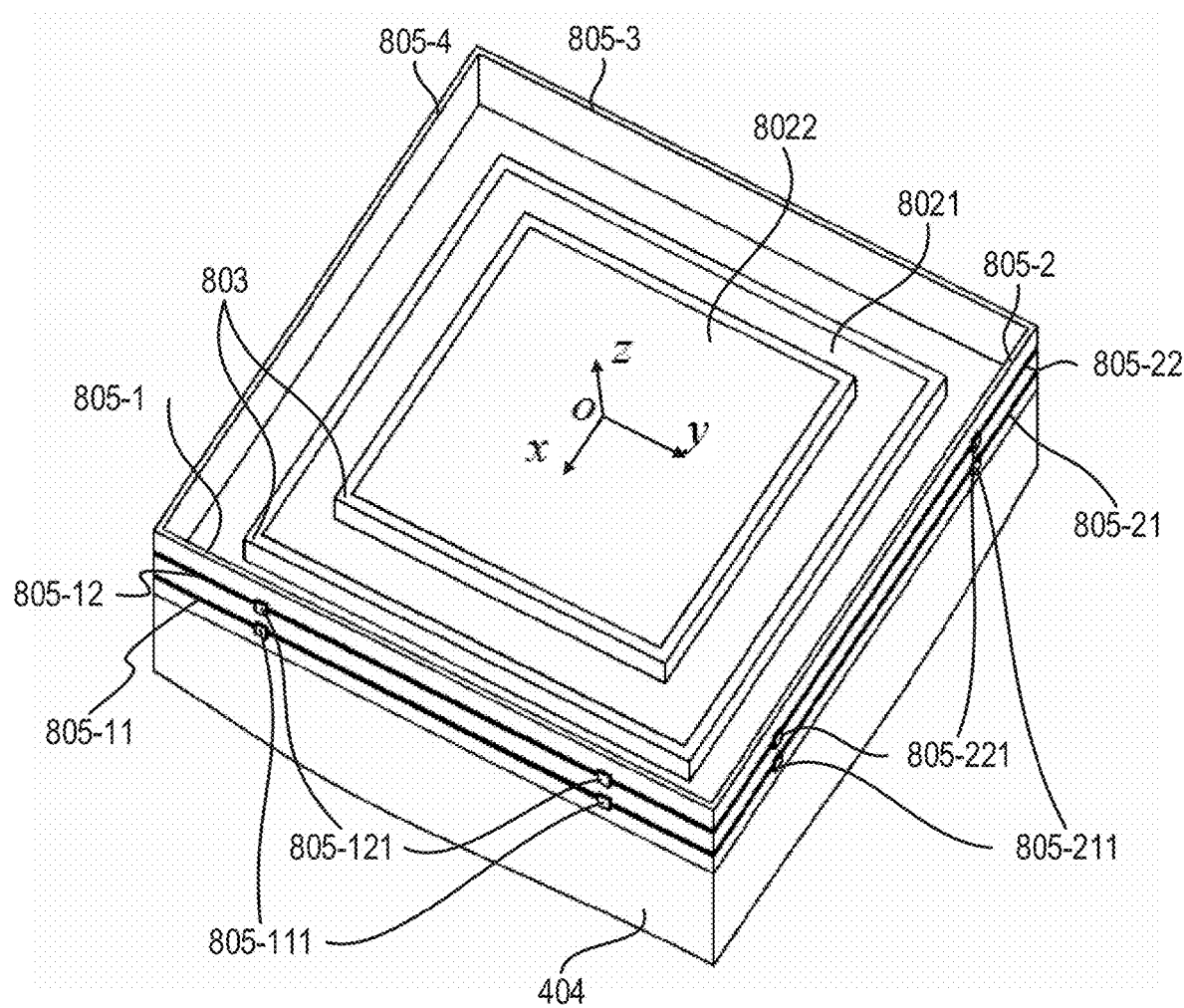
Figure 9A:
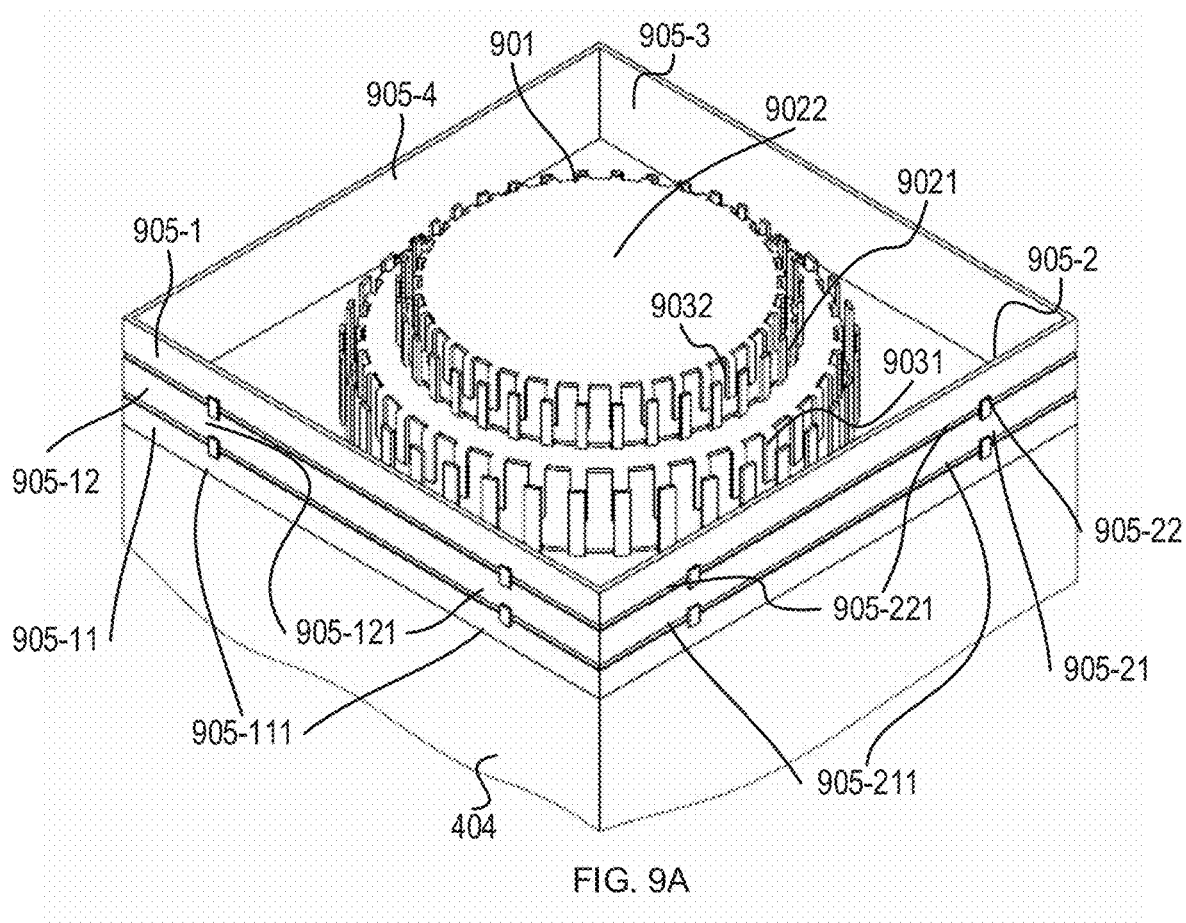
Figure 9B:
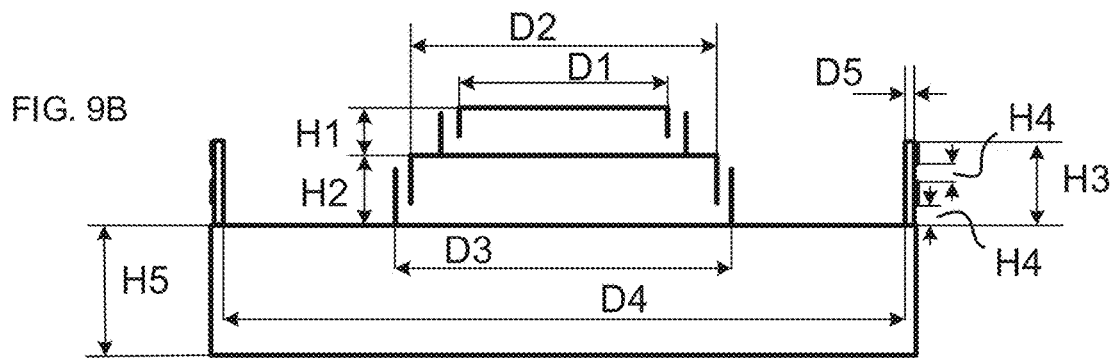
Figure 9C:
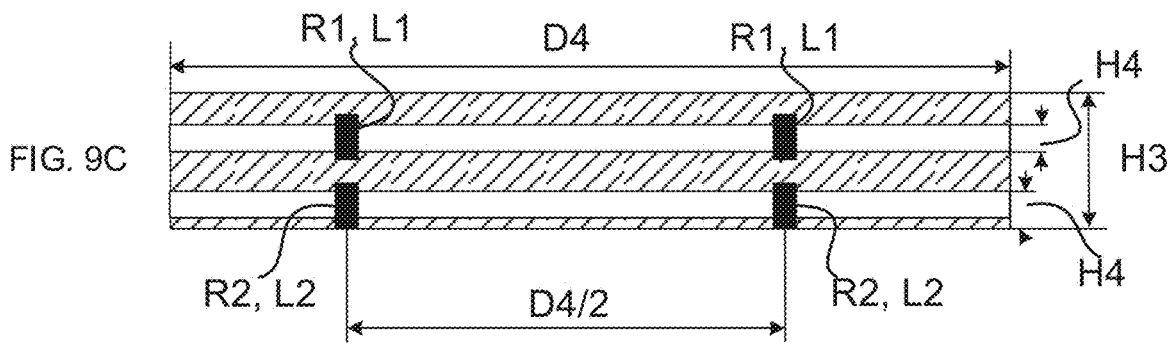

FIG. 4 schematically shows the working principle of the vertical semitrasparent screen;

FIG. 5 shows a single-band antenna system;

FIG. 6 shows schematic of one of the segments of the vertical semitransparent screen;

FIGS. 7A-7G schematically show possible connections of lumped elements;

FIG. 8 schematically shows a two-band antenna system;

FIG. 9A schematically shows one of the embodiments of the antenna system;

FIGS. 9B-9C show schematic views of the embodiment shown in FIG. 9A.

Figure 10A:
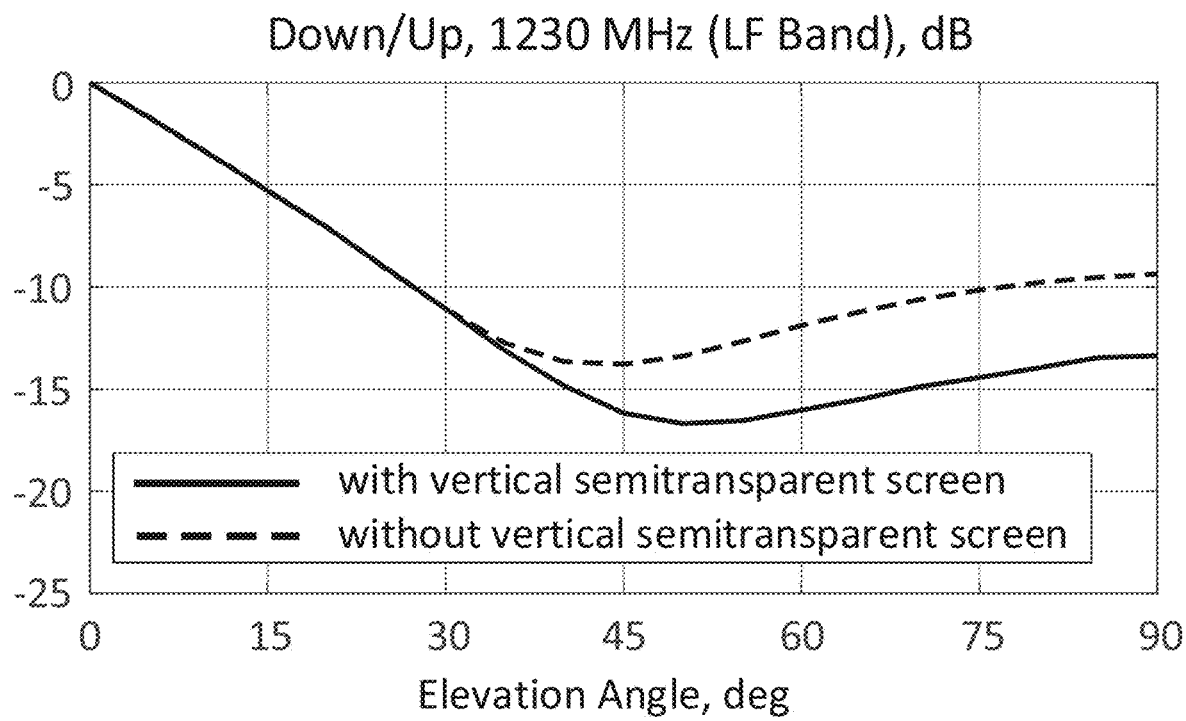
Figure 10B:
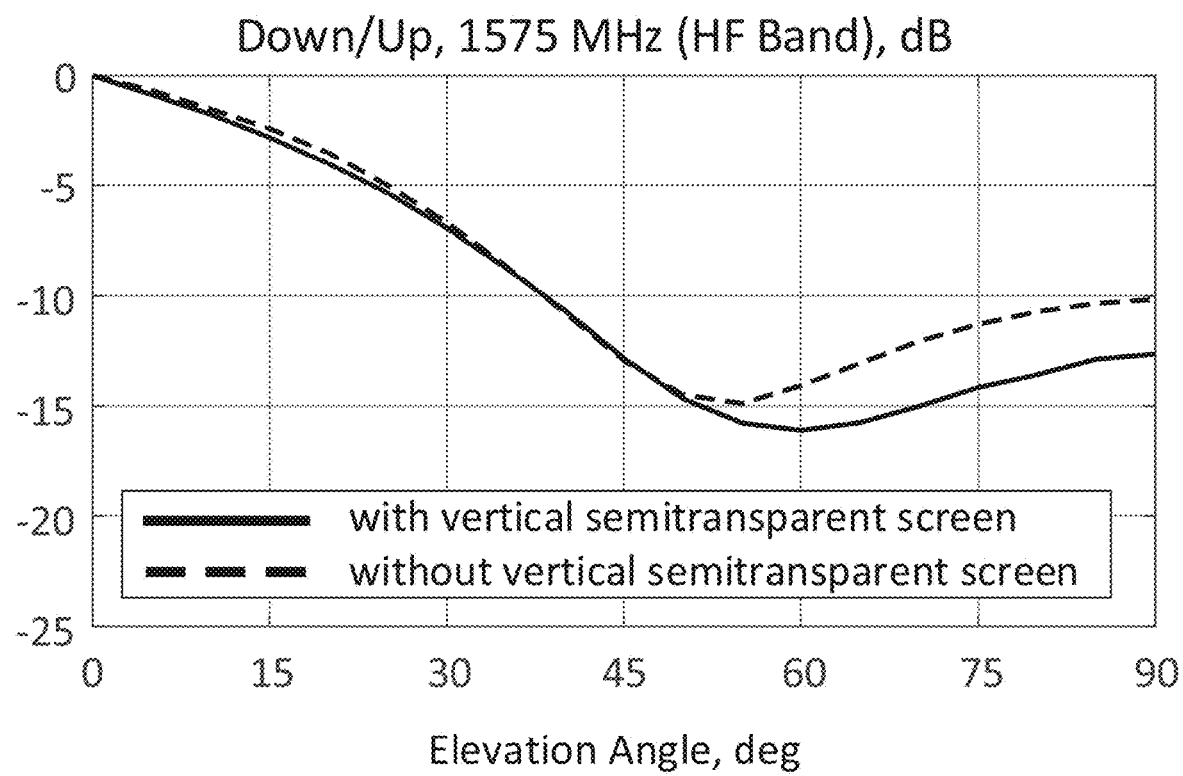
Figure 11:
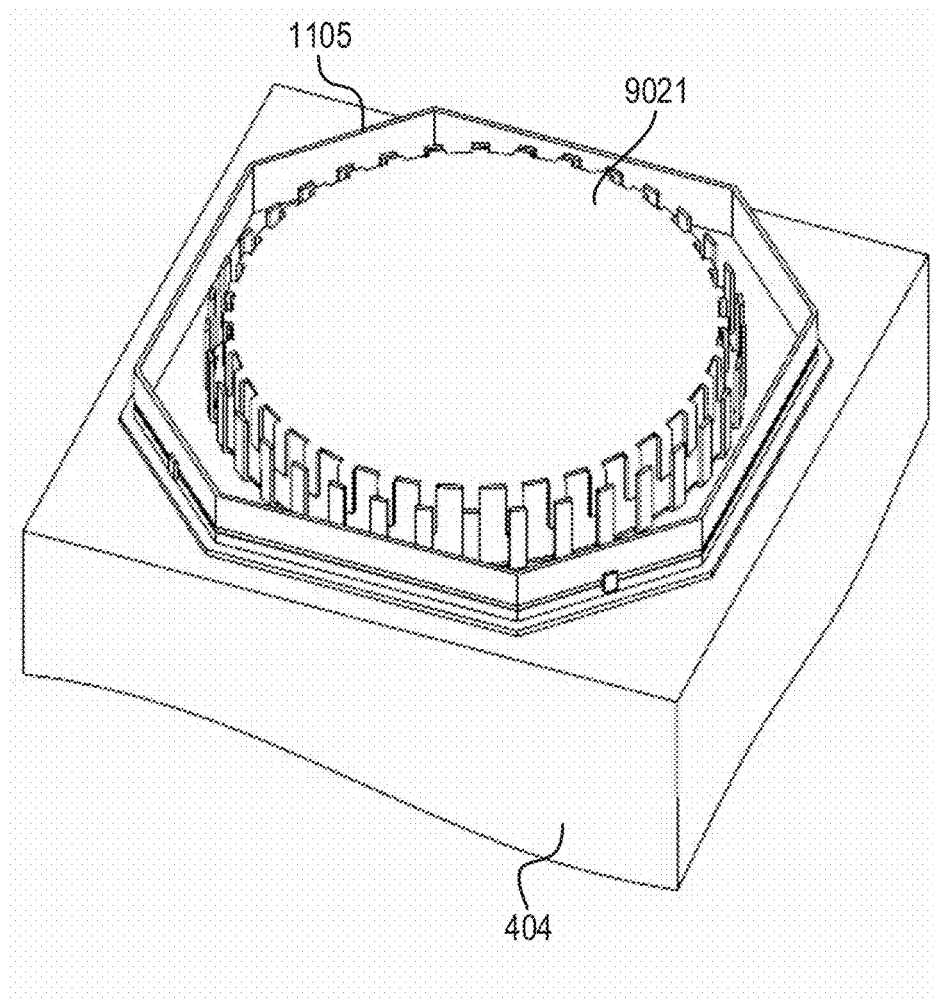

FIGS. 10A-10B show Down/Up ratio plots;

FIG. 11 schematically shows an embodiment of the antenna system having vertical semitransparent screen with 8 ribs.

Figure 12:
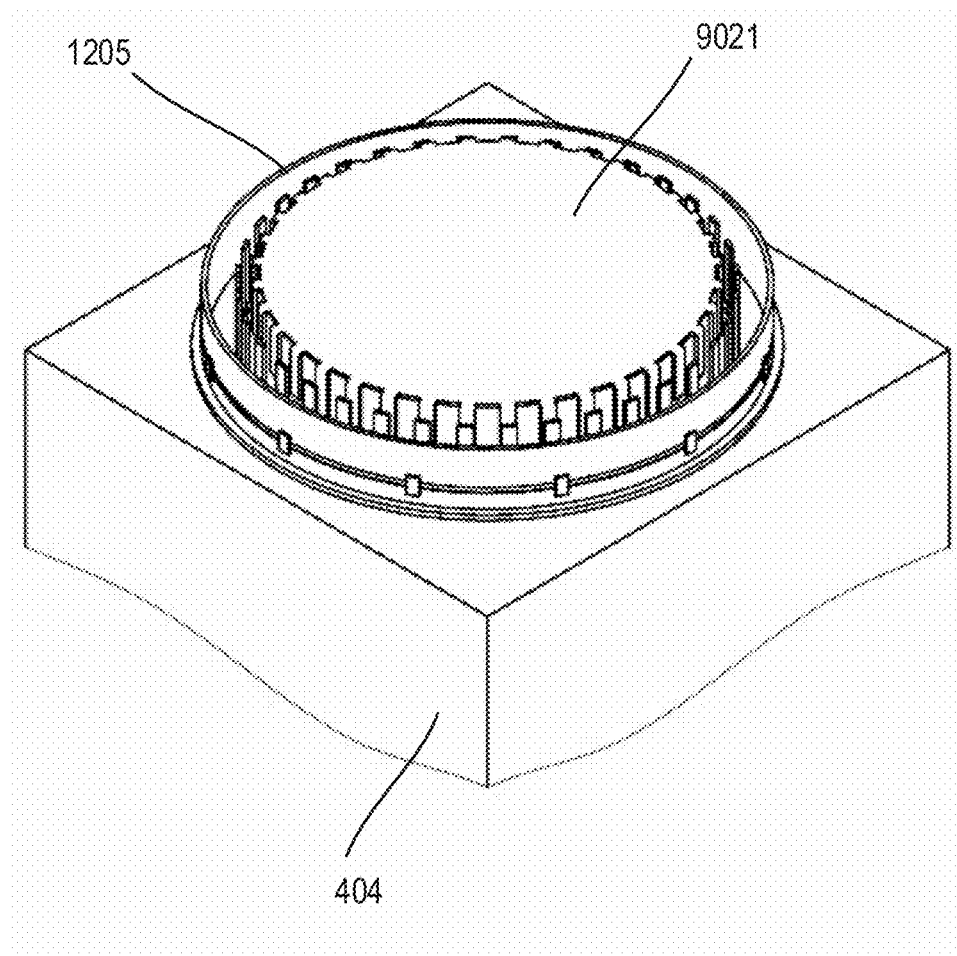
Figure 13:
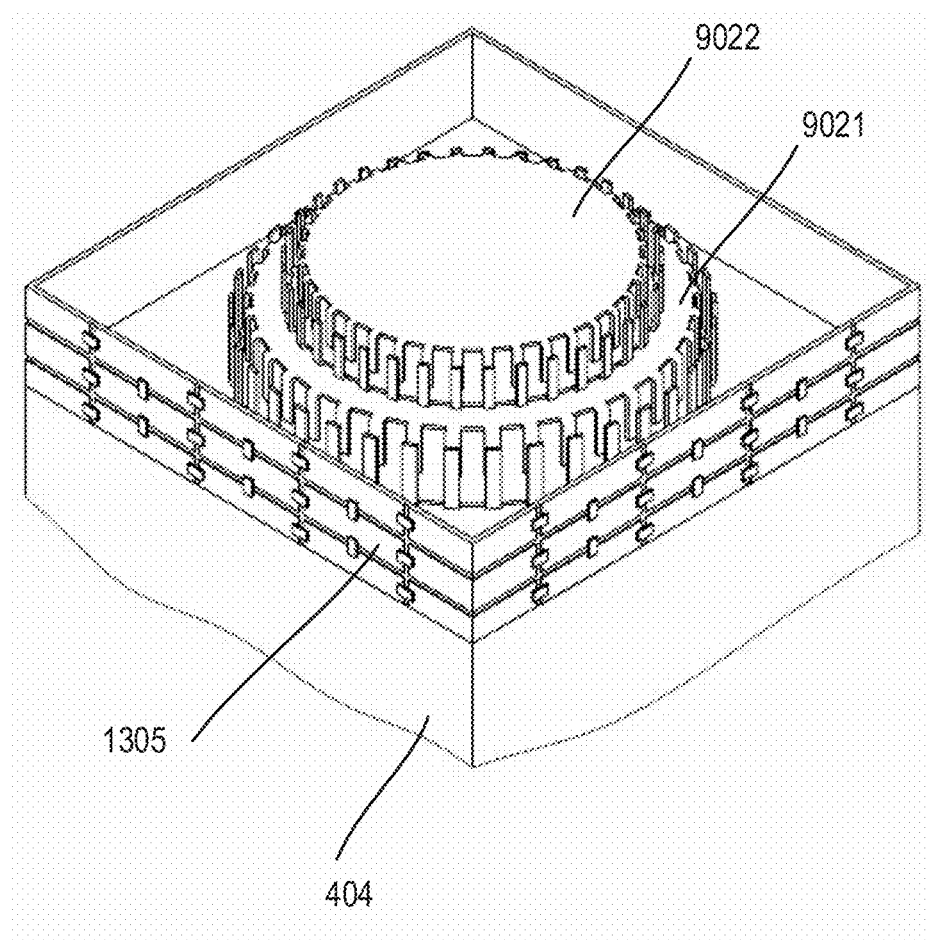

FIG. 12 schematically shows an embodiment of the antenna system having a vertical semitransparent screen with a rib formed as a cylinder having its center on a Z axis;

FIG. 13 schematically shows an embodiment of the antenna system having vertical semitransparent screen with additional vertical slots.

DETAILED DESCRIPTION OF THE PREFERRED EMBODIMENTS

Reference will now be made in detail to the preferred embodiments of the present invention, examples of which are illustrated in the accompanying drawings.

Figure 1:
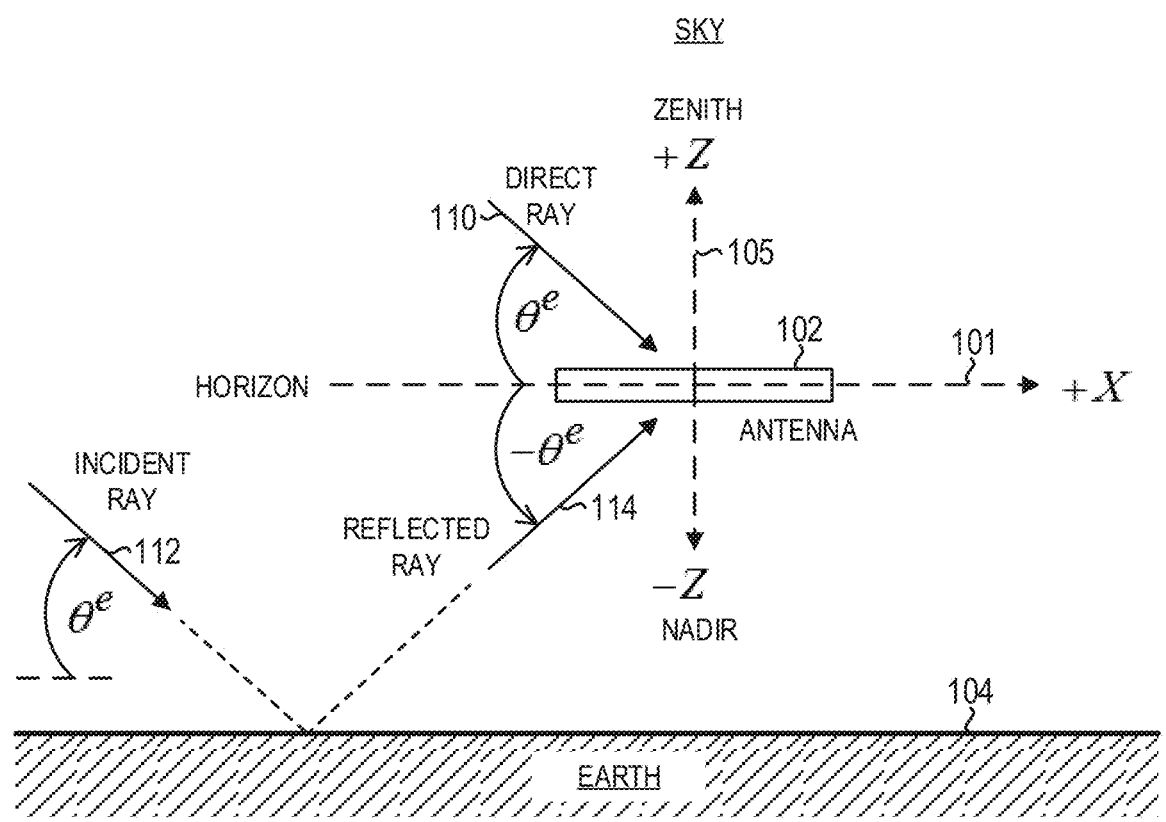
FIG. 1 shows a schematic of a direct signal region and a multipath signal region.

FIG. 1 shows a schematic of a global navigation satellite system (GNSS) antenna 102 positioned above the Earth 104. Herein, the term Earth includes both land and water environments. To avoid confusion with "electrical" ground (as used in reference to a ground plane), "geographical" ground (as used in reference to land) is not used herein. To simplify the drawing, supporting structures for the antenna are not show. Shown is a reference Cartesian coordinate system with X-axis 101 and Z-axis 105. The Y-axis (not shown) points into the plane of the figure. In an open-air environment, the +Z (up) direction, referred to as the zenith, points towards the sky, and the −Z (down) direction, referred to as the nadir, points towards the Earth. The X-Y plane lies along the local horizon plane.

In FIG. 1, electromagnetic waves (carrying electromagnetic signals) are represented by rays with an elevation angle $\theta^e$ with respect to the horizon. The horizon corresponds to $\theta^e=0$ deg; the zenith corresponds to $\theta^e=+90$ deg; and the nadir corresponds to $\theta^e=-90$ deg. Rays incident from the open sky, such as ray 110 and ray 112, have positive values of elevation angle. Rays reflected from the Earth 104, such as ray 114, have negative values of elevation angle. Here, the region of space with positive values of elevation angle is referred to as the direct signal region and is also referred to as the forward (or top) hemisphere. Here, the region of space with negative values of elevation angle is referred to as the multipath signal region and is also referred to as the backward (or bottom) hemisphere. Ray 110 impinges directly on the antenna 102 and is referred to as the direct ray 110; the angle of incidence of the direct ray 110 with respect to the horizon is $\theta^e$. Ray 112 impinges directly on the Earth 104; the angle of incidence of the ray 112 with respect to the horizon is $\theta^e$. Assume ray 112 is specularly reflected. Ray 114, referred to as the reflected ray 114, impinges on the antenna 102; the angle of incidence of the reflected ray 114 with respect to the horizon is $-\theta^e$.

To numerically characterize the capability of an antenna to mitigate the reflected signal, the following ratio is commonly used:

$$DU(\theta^e) = \frac{F(-\theta^e)}{F(\theta^e)}. \tag{E1}$$

The parameter $DU(\theta^e)$ (down/up ratio) is equal to the ratio of the antenna directivity pattern level $F(-\theta^e)$ in the backward hemisphere to the antenna directivity pattern level $F(\theta^e)$ in the forward hemisphere at the mirror angle, where F represents a voltage level. Expressed in dB, the ratio is:

$$DU(\theta^e)(dB)=20\log DU(\theta^e)$$

A commonly used characteristic parameter is the down/up ratio at $\theta^e=+90$ deg:

$$DU_{90} = DU(\theta^e = 90°) = \frac{F(-90°)}{F(90°)}. \tag{E3}$$

Figure 2:
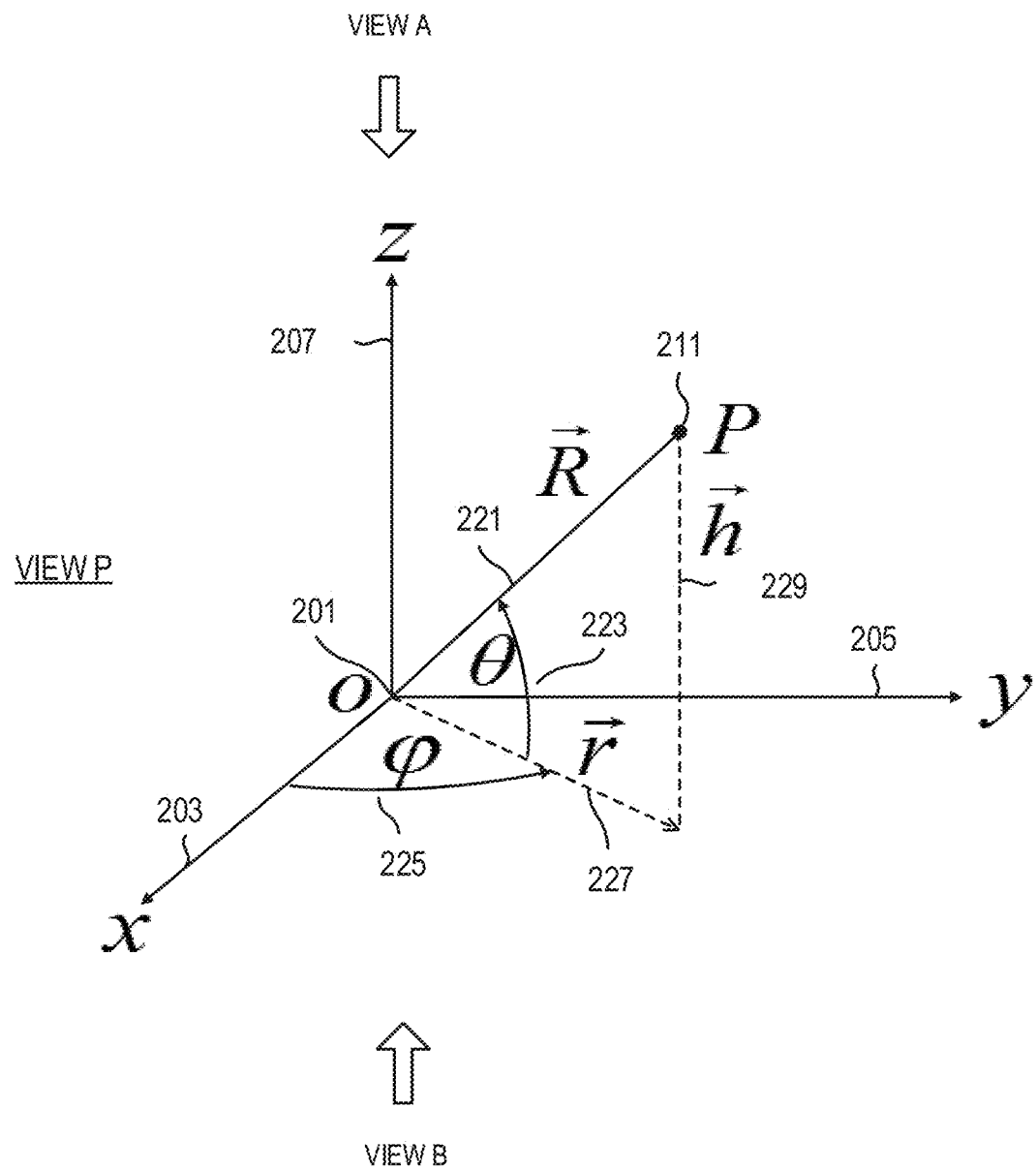
FIG. 2 shows a schematic of an antenna reference coordinate system.
Figure 3:
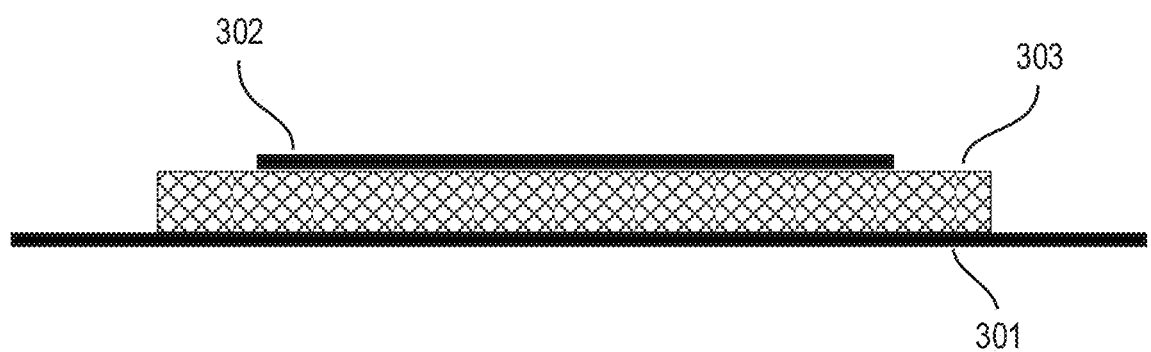
FIG. 3 shows schematic of an ordinary patch antenna with a dielectric substrate.

The geometry of antenna systems is described with respect to the Cartesian coordinate system shown in FIG. 2 (View P, perspective view). The Cartesian coordinate system has origin o 201, X-axis 203, Y-axis 205, and Z-axis 207. The coordinates of the point P 211 are then P(x, y, z). Let R 221 represent the vector from 0 to P. The vector $\vec{R}$ can be decomposed into the vector $\vec{r}$ 227 and the vector $\vec{h}$ 229, where $\vec{r}$ is the projection of $\vec{R}$ onto the X-Y plane, and $\vec{h}$ is the projection of $\vec{R}$ onto the Z-axis.

The coordinates of P can also be expressed in the spherical coordinate system and in the cylindrical coordinate system. In the spherical coordinate system, the coordinates of P are P(R, θ, φ), where R=|$\vec{R}$| is the radius, θ223 is the polar angle measured from the X-Y plane, and φ225 is the azimuthal angle measured from the X-axis. In the cylindrical coordinate system, the coordinates of P are P(r, φ, h), where r=|$\vec{r}$| is the radius, φ is the azimuthal angle, and h=|$\vec{h}$| is the height measured parallel to the Z-axis. In the cylindrical coordinate axis, the Z-axis is referred to as the longitudinal axis. In geometrical configurations that are azimuthally symmetric about the Z-axis, the Z-axis is referred to as the longitudinal axis of symmetry, or simply the axis of symmetry if there is no other axis of symmetry under discussion.

The polar angle θ is more commonly measured down from the +Z-axis (0≤θ≤α). Here, the polar angle θ223 is measured from the X-Y plane for the following reason. If the Z-axis 207 refers to the Z-axis of an antenna system, and the Z-axis 207 is aligned with the geographic Z-axis 105 in FIG. 1, then the polar angle θ223 will correspond to the elevation angle $\theta^e$ in FIG. 1; that is, −90°≤θ≤+90°, where θ=0° corresponds to the horizon, θ=+90° corresponds to the zenith, and θ=−90° corresponds to the nadir.

A nontransparent surface is a surface fully reflecting an incident electromagnetic wave. An ideal conducting surface is an example of such surfaces.

A semitransparent surface refers to a surface partly reflecting an incident electromagnetic wave and partly letting it pass, i.e., reflecting from approx. 10% to approx. 90%. A metal surface with a set of slots is one example. The slots include lumped elements having impedance such as inductances and/or resistors and/or capacitors.

Interaction of electromagnetic waves with semi-transparent screen can be characterized by a parameter called the screen impedance and designated by Z. The impedance can be presented in the form of a sum Z=R+iX, where R, X are active and reactive parts, respectively. When X>0, the impedance is inductive. When X<0, the impedance is capacitive. Components R, X are conveniently measured in relative units which are the fractions of the universal constant $W_0=120\pi$ (which is the free-space characteristic impedance). The numerical value is $W_0 \approx 377$ Ohm. When $Z>>|W_0|$, the screen can be regarded as fully transparent. When $Z<<|W_0|$ the screen is regarded as nontransparent, i.e., fully reflecting electromagnetic waves that is similar to metals. When R>0, the screen partly absorbs electromagnetic waves, which means a reduction in magnitude (amplitude) of the electromagnetic waves. The reactive part $X \neq 0$ influences the phase shift of an electromagnetic wave. By selecting the desired impedance, one can provide a required degree of passing electromagnetic radiation, its reflection and absorption, thereby affecting the amplitudes and phases of waves being passed-through and diffracted. In many applications it is more useful to use the parameter that is an inverse of Z, called admittance, and designated by Y. The admittance can be presented in the form of $$Y = \frac{1}{R+iX} = G + iB,$$

where G and B are active and reactive parts correspondingly. When B<0 the admittance is inductive. When B>0 the admittance is capacitive. The desired impedance of the semitransparent screen is in the order of $Z \sim |W_0|$. It is provided by a number of lumped elements being resistors and/or inductances and/or capacitors that can be parallel- or series- connected to the slot.

FIG. 4 schematically shows the working principle of the vertical semitrasparent screen. Shown are a radiating patch 402 with a dielectric substrate 403 on the ground plane 401, the semitransparent screen 405 and the body of the receiver 404. A field in the bottom hemisphere can be represented in the form of two field components: one bending the semitransparent screen (solid arrows) and the other passing through the semitransparent screen (dashed arrows). To suppress the electromagnetic field in the bottom hemisphere (in particular, in the nadir direction), parameters of the vertical semitransparent screen are selected such that amplitudes of these components are same and phase difference between them equals to 180°. Nominal values of lumped elements and their arrangement are such parameters.

A table with examples of such nominal values will be presented below. Thus, the field components are subtracted, and hence the total field is suppressed in the bottom hemisphere.

A first embodiment of the proposed design in FIG. 5 presents a right hand circularly polarized patch antenna installed onto a housing of integrated receiver 404. The antenna includes a ground plane 501, patch 502, and a dielectric substrate 503. A circularly-polarized mode can be implemented by an excitation circuit connected to excitation pins (not shown). The excitation circuit powers the excitation pins at 90° phase shift in such a way that a right hand circularly-polarized wave is excited in the positive Z-axis direction (the zenith-direction). Similar circuits are well-known and are not further described.

There is also a closed vertical semitransparent screen 505 including n segments 505-n, where n≥4. FIG. 5 shows an embodiment with four symmetrical segments, namely ribs 505-1, 505-2, 505-3, 505-4. Segments 505-2, 505-3, 505-4 are similar to segment 505-1. They can be obtained by the symmetry of rotation in 90° relative to axis Z.

There is a slot 505-n1 in the vertical semitransparent screen 505 which breaks electric contact between conducting parts of the screen along the whole perimeter. Sets of elements 505-n11 (i.e., with the corresponding numbering 505-111, 505-211, etc.) with impedance ensuring the required DP with the minimum in the nadir direction are connected to slot 505-n1.

Each rib can be manufactured based on PCB-technology and present a printed board. In this case, as shown in FIG. 6, a base 601 is a dielectric substrate for a PCB with conducting metallization 602. Note that the dielectric substrate serves as a mechanical support of the rib.

Each set is a number of lumped elements that can be parallel- or series- connected according to (FIG. 7A-7G), the lumped elements being resistors and/or inductances and/or capacitors. The nominal values of the lumped elements and their connection are selected such that the required impedance could be provided in the given frequency band.

As an example, following calculations can be considered for the case of parallel connection of resistors and inductances. It is convenient to employ the admittance per unit length: $Y_D = Y/D$, where D is the distance in meters between elements along the perimeter of the semitransparent screen. Desired values of corresponding parts of the $Y_D = G_D + iB_D$ are approximately in the range $$G_D = \frac{3 \ldots 30}{W_0} [m^{-1}], B_D = \frac{-35 \ldots -200}{W_0} [m^{-1}].$$

Numerical values are $G_D \approx 0.008 \ldots 0.08 [Ohm^{-1} \cdot m^{-1}]$, $B_D \approx -0.09 \ldots -0.54 [Ohm^{-1} \cdot m^{-1}]$. Corresponding nominal values of the lumped elements for the case are determined as $L_i = (-2\pi f \cdot B_D \cdot D)^{-1} [H]$, $R_i = (G_D \cdot D)^{-1} [Ohm]$, where f is the desired frequency in Hz.

The number of sets 505-n11 can vary, it affect the nominal values of the lumped elements. Location of sets in a slot can also vary. For example, they can be arranged equal-distant from each other along the whole slot perimeter. FIG. 5 shows an embodiment with eight similar sets 505-n11 aligned around the perimeter of slot 505-n1 (two sets on each rib).

Sets with lumped elements having different nominal values can also be used within the same rib.

Both lumped and shared-circuit elements can be used as capacitors, resistors and inductors. Nominal values of these elements are selected based on the condition of field suppression in the lower hemisphere at the required bandwidth.

The width of slots is defined by a convenient installation of elements containing resistors, inductors and capacitors. For example, for lumped elements the width of the slot is determined by the size of the corresponding components.

FIG. 5 shows an embodiment wherein slot 505-n1 is in the middle of vertical semitransparent screen 505-n, the bottom metal part of the vertical semitransparent screen is galvanic-coupled with housing 404 around the perimeter. For example, it can be made as follows: the ground plane of the patch antenna is a PCB, the vertical semitransparent screen is soldered to the ground plane, and the ground plane in turn is screwed to the receiver housing and galvanically coupled to it.

The slot can be also at the base of vertical semitransparent screen 505-n in such a way that the metal part of the vertical semitransparent screen would be coupled to the housing of receiver 404 via sets of elements 505-n11.

FIG. 8 shows an embodiment of a dual-band antenna system. The antenna can be made as a stacked patch antenna. The stacked patch antenna comprises a low-frequency patch (LF) 8021, a high-frequency patch (HF) 8022, the patches being on the housing 404 of a receiver. The LF patch 8021 is a ground plane for the HF patch 8022. A ground plane for the LF patch 8021 is the housing 404. Between the patch 8021 and the housing 404 there is a dielectric 803. In the space between patches 8021 and 8022 there is a dielectric 803.

There is also a closed vertical semitransparent screen 805 including ribs 805-n, where n≥4. Ribs 805-2, 805-3, 805-4 are the same as rib 805-1. They can be obtained by the symmetry of rotation in 90° about Z-axis. Each segment can be made by PCB technology and is a printed circuit board. The structure of these segments is the same as described and illustrated in FIG. 6. Shown in FIG. 6 are: dielectric substrate 601, metal conducting areas 602, slot 505-11, and sets of lumped elements 505-111.

Unlike of the embodiment of FIG. 5, the vertical semitransparent screen 805 has two slots 805-n1 and 805-n2 breaking the electric contact between the conducting parts of the screen around the perimeter. Element sets 805-n11 are connected to slot 805-n1, and element sets 805-n21 are connected to slot 805-n2. Sets 805-n11, 805-n21 are arranged equal-distant from each other along the perimeter of slots 805-n1, 805-n2 correspondingly.

Each set is a number of lumped elements (resistors and/or inductors and/or capacitors) which can be parallel- or series-connected according to FIGS. 7A-7G. The nominal values of the lumped elements and their connection are selected such that the required impedance could be provided in the given frequency band.

Impedance of sets 805-n11 in slot 805-n1 is selected such that a required DP with the minimum in the nadir direction in the LF band would be provided. And impedance of sets 805-n21 in slot 805-n2 is selected in such a way that DP has minimum in the nadir direction in the HF-band.

In another embodiment, impedance of sets 805-n11 in slot 805-n1 is selected such that a required DP with the minimum in the nadir direction in the HF band would be provided. And impedance of sets 805-n21 in slot 805-n2 is selected in such a way that DP has minimum in the nadir direction in the LF band.

The number of sets 805-n11, 805-n21 can vary, it affects the selection of nominal values of lumped elements. The arrangement of the sets in the slot can also vary. For example, they can be arranged equally-distant from one another around the perimeter of the slot. FIG. 8 presents an embodiment of eight similar sets 805-n11 around the perimeter of slot 805-n1 and eight similar sets 805-n21 along the perimeter of slot 805-n2 (in fours at each rib). Within the same rib, sets 805-n11 in slot 805-n1 can include lumped elements with different nominal values or within the same rib sets 805-n21 in slot 805-n2 can include lumped elements with different nominal values.

Patches of LF and HF bands can be circular. Capacitive elements can be used instead of dielectric. A design example of such a patch is shown in FIG. 9A. Here, there is an LF patch 9021 above ground plane 901. Above patch 9021 there is HF patch 9022, the patch 9021 being the ground plane of patch 9022. And ground plane 901 can be the housing of receiver 404. So, between ground plane 901 and patch 9021 there is an air gap. The same gap is also between ground plane 9021 and patch 9022. Capacitive elements of the LF band are made as an interdigitating structure 9031 arranged along the perimeter of the LF patch 9021. Capacitive elements of the HF band are made as an interdigitating structure 9032 arranged along the perimeter of the HF patch 9022. The interdigitating structure is a set of conductor pairs. In case of the interdigitating structure of LF band 9031 each pair has one conductor being connected to ground plane 901 and the other conductor—connected to LF patch 9021. In case of interdigitating structure of HF band 9032 each pair has one conductor connected to HF patch 9022, and the other conductor—to LF patch 9021.

Semitransparent screen 905-n has two slots: 905-n1 and 905-n2 breaking electric contact between the conducting screen parts along the perimeter. Sets of elements 905-n11 are connected to slot 905-n1, and element sets 905-n21 are connected to slot 905-n2. Sets 905-n11, 905-n21 are located at the same distance from each other around the perimeter of slots 905-n1, 905-n2 respectively.

Each set is several lumped elements (resistors and/or inductors, and/or capacitors) which can be connected in parallel or in series according to FIGS. 7A-7G. The nominal values of lumped elements and the method of their connection are selected such that the required impedance could be provided in the given frequency band. Impedance of sets 905-n11 in slot 905-n1 is selected such that a required DP with the minimum in the LF band would be provided. Impedance of sets 905-n21 in slot 905-n2 is selected such that a required DP with the minimum in the HF band would be provided.

The number of sets 905-n11, 905-n21 can vary, and it affects the selection of nominal values of lumped elements. The arrangement of the sets in the slot can also vary. For example, they can be arranged approximately equally-distant from one another around the perimeter of the slot. FIG. 9A presents an embodiment of eight similar sets 905-n11 around the perimeter of slot 905-n1 and eight similar sets 905-n21 along the perimeter of slot 905-n2 (in fours at each rib). Within the same rib sets 905-n11 in slot 905-n1 can include lumped elements with different nominal values or within the same rib sets 805-n21 in slot 805-n2 can include lumped elements with different nominal values.

FIG. 9B shows a schematic view of the embodiment shown in the FIG. 9A. FIG. 9C shows a schematic view of the arrangement of the sets of lumped elements.

As noted above, the DU ratio can be used for numerical evaluation of a degree of suppression in the bottom hemisphere.

FIGS. 10A-10B show graphs of DU ratio for the structure presented in FIGS. 9A-9C. In this structure 8 similar element sets around the perimeter (for a total of 16) are connected to each of two slots.

Figure 7A:
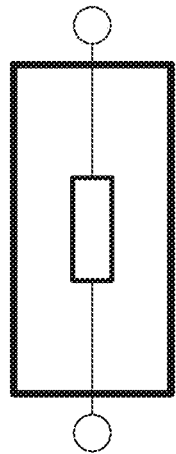
Figure 7B:
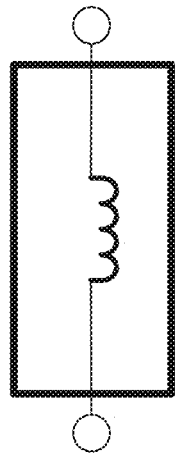
Figure 7C:
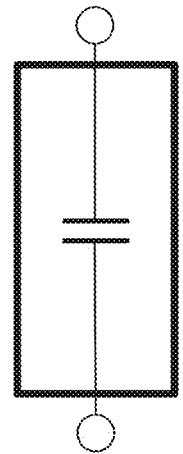
Figure 7D:
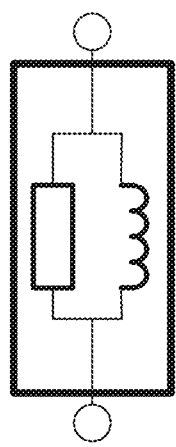
Figure 7E:
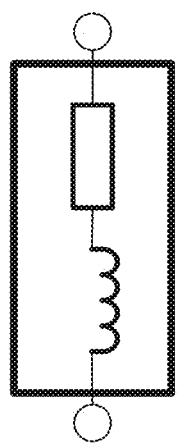
Figure 7F:
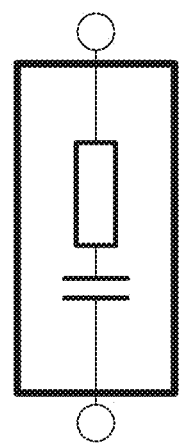
Figure 7G:
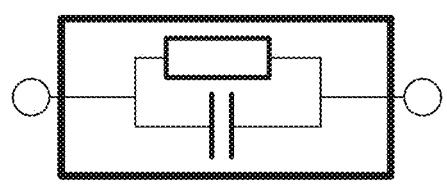

Each set is two lumped elements: a resistor R and inductance L connected in parallel in accordance with FIG. 7D.

The nominal values of lumped elements R1 and L1 for sets 905-n21 in slot 905-n2 are selected such that the set has the required impedance in the HF band. And impedances of sets 905-n21 in slot 905-n2 are selected to provide the required DP in the HF band.

The nominal values of lumped elements R2 and L2 for sets 905-n11 in slot 905-n1 are selected such that the set has the required impedance in the LF frequency band. And impedances of sets 905-n11 in slot 905-n1 are selected such that the set has the required impedance in the LF band. Parameters of the structure according to the designations shown in FIG. 9B and FIG. 9C are:

| D1 | D2 | D3 | D4 | D5 | H1 | H2 | H3 | H4 | H5 | R1 | L1 | R2 | L2 |
|---|---|---|---|---|---|---|---|---|---|---|---|---|---|
| 54 mm | 71 mm | 75 mm | 105 mm | 1 mm | 8 mm | 12 mm | 12 mm | 1 mm | 60 mm | 1.27 kOhm | 7.5 nH | 301 Ohm | 15 nH |

FIG. 10A shows DU graphs for the frequency of 1230 MHz (LF band). The solid line corresponds to the case of availability of the vertical semitransparent screen 905, the dotted line—unavailability of the vertical semitransparent screen 905. It can be seen that the vertical semitransparent screen 905 results in a reduction in DU ratio. In the nadir direction DU ratio reduces from −9 dB up to −13 dB.

FIG. 10B shows DU graphs for frequency 1575 MHz (HF band). The solid line corresponds to the case when the vertical semitransparent screen 905 is available, the dotted line—when the vertical semitransparent screen 905 is unavailable. It can be seen that the vertical semitransparent screen 905 results in a reduction in DU ratio. In the nadir direction DU ratio reduces from −10 dB to −13 dB.

Some embodiments with a vertical semitransparent screen made in the form of ribs arranged in a square were described above. Another embodiment can include a vertical semitransparent screen in the shape of a polygon in a plan view, and with a height of 0.5 cm-3 cm. FIG. 11 shows an embodiment of a vertical semitransparent screen consisting of 8 ribs. Four similar element sets arranged at the equal distance from each other around the perimeter are connected to the slot.

One more embodiment includes a vertical semitransparent screen with a rib formed as a cylinder having its center on Z axis (FIG. 12).

Another embodiment further includes a vertical semitransparent screen with additional vertical slots to which reactive elements with the given impedance are connected. For example, FIG. 13 shows a vertical semitransparent screen in the form of a PCB. In this case each segment of the vertical semitransparent screen is a structure with a set of slots, with lumped elements (resistors and/or capacitors and/or inductors) being connected to each of slots.

The number of horizontal slots can be greater than two. However, a larger number of slots can cause an increase in the vertical dimension of the antenna system, which may be undesirable in terms of overall dimensions.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. An antenna system comprising:
a right-hand circularly polarized antenna for receiving Global Navigation Satellite System (GNSS) signals and located on a conductive receiver housing;
a vertical semitransparent screen for providing an Down/Up ratio $$DU_{90} = DU(\theta^e = 90°) = \frac{F(-90°)}{F(90°)}$$

of −13 dB or better for at least some GNSS frequencies, where F is an antenna directivity pattern level;
the semitransparent screen being connected to a ground plane of the antenna;
the ground plane being connected to the conductive receiver housing;
the semitransparent screen further comprising a horizontal slot to which sets of lumped impedance elements are connected,
wherein each set includes several lumped elements;
wherein the lumped elements are capacitors and/or inductors and/or resistors;
wherein the lumped elements in each set are connected in parallel or series; and
the semitransparent screen including at least 4 segments arranged symmetrically around the center of the antenna and connected to each other.

2. The antenna system of claim 1, wherein the semitransparent screen includes an upper slot and a lower slot to which sets of lumped elements are connected,
wherein nominal values of the lumped elements connected to the upper slot provide the Down/Up ratio of −13 dB or better in the nadir direction in the HF band; and
wherein nominal values of the lumped elements connected to the lower slot provide the Down/Up ratio of −13 dB or better in the nadir direction in the LF band.

3. The antenna system of claim 1, wherein the semitransparent screen includes an upper slot and a lower slot to which sets of lumped elements are connected,
wherein nominal values of the lumped elements connected to the upper slot provide the Down/Up ratio of −13 dB or better in the nadir direction in the LF band; and
wherein nominal values of the lumped elements connected to the lower slot provide the Down/Up ratio of −13 dB or better in the nadir direction in the HF band.

4. The antenna system of claim 1, wherein the vertical semitransparent screen includes one rib shaped as a cylinder with a center on a Z axis of the antenna.

5. The antenna system of claim 4, wherein the vertical semitransparent screen further includes vertical slots to which the sets of lumped elements are connected.

6. The antenna system of claim 1, wherein the semitransparent screen includes an upper slot and a lower slot, and wherein the set of lumped elements includes an upper set and a lower set, and wherein the upper set is conencted across the upper slot, and the lower set is connected across the lower slot.

7. The antenna system of claim 1, wherein the vertical semitransparent screen is generally square in plan view.

8. The antenna system of claim 1, wherein the vertical semitransparent screen is generally octagonal in plan view.

9. The antenna system of claim 1, wherein the vertical semitransparent screen is generally circular in plan view.

10. An antenna system comprising:
a circularly polarized antenna for receiving Global Navigation Satellite System (GNSS) signals;
a conductive GNSS receiver housing located below the antenna;
a vertical semitransparent screen around the antenna;
the semitransparent screen being connected to a ground plane of the antenna;

the ground plane being connected to the conductive receiver housing;

the semitransparent screen further comprising a horizontal slot across which a plurality of lumped impedance elements are connected;

wherein each set of lumped elements includes capacitors and/or inductors and/or resistors connected in parallel or series; and the semitransparent screen including at least 4 segments arranged symmetrically around a center of the antenna and connected to each other;

the antenna system exhibiting a Down/Up ratio $$DU_{90} = DU(\theta^e = 90°) = \frac{F(-90°)}{F(90°)}$$

of −13 dB or better for at least some GNSS frequencies, where F is an antenna directivity pattern level.

* * * * *